United States Patent [19]
Bailey

[11] Patent Number: 5,005,257
[45] Date of Patent: Apr. 9, 1991

[54] MEAT HOOK

[75] Inventor: Ronald F. Bailey, Omaha, Nebr.

[73] Assignee: Rare Research, Omaha, Nebr.

[21] Appl. No.: 389,789

[22] Filed: Aug. 4, 1989

[51] Int. Cl.[5] .............................................. B65G 7/12
[52] U.S. Cl. ..................................... 452/185; 294/26;
452/187
[58] Field of Search ................ 17/1 R, 44.3; 294/137,
294/26, 82.4; 99/421 A

[56] References Cited

U.S. PATENT DOCUMENTS

| 687,137 | 11/1901 | Druen | 294/26 |
|---|---|---|---|
| 2,488,312 | 11/1949 | Millican et al. | 294/26 |
| 2,547,273 | 4/1951 | Febvre et al. | 294/26 |
| 4,023,844 | 5/1977 | Roberts | 294/26 |
| 4,168,856 | 9/1979 | Rhoades | 294/26 |
| 4,734,984 | 4/1988 | Snell et al. | 294/26 |

*Primary Examiner*—Willis Little
*Attorney, Agent, or Firm*—Vincent L. Carney

[57] ABSTRACT

To provide an improved meat hook for piercing and moving meat, the meat hook comprises: (1) a rigid, curved cylinder having a pointed meat piercing end; (2) a handle engaging end; and (3) a handle rigidly secured to the handle engaging end of the cylinder with the cylinder extending from the front side of the handle near one end at an angle of approximately 90 degrees or more. The cylinder is formed with an inclined portion extending from the handle engaging end with a curved end section extending from the inclined portion and relatively straight portion extending from the curved end section to form a pointed, piercing end. The piercing end is preferably in prallel, spaced relation from the front side of the handle and may be formed to extend beyond a plane which passes through the end of the handle. The meat book may be grasped with the cylinder adjacent to the index finger or the little finger to selectively position the meat piercing end in either direction for piercing the meat with a downward or upward thrust.

23 Claims, 2 Drawing Sheets

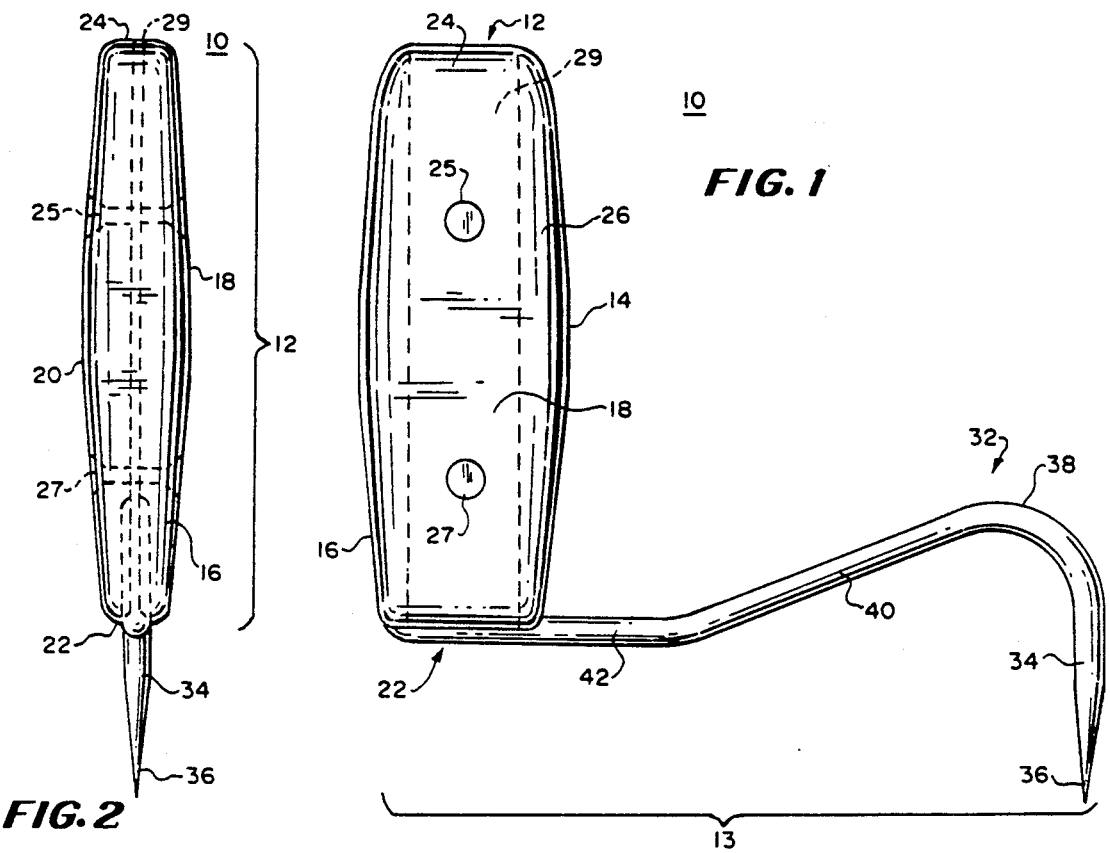
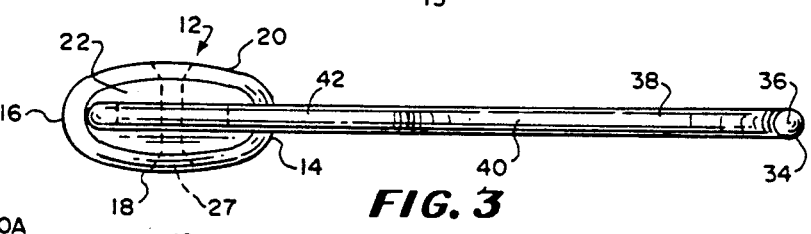
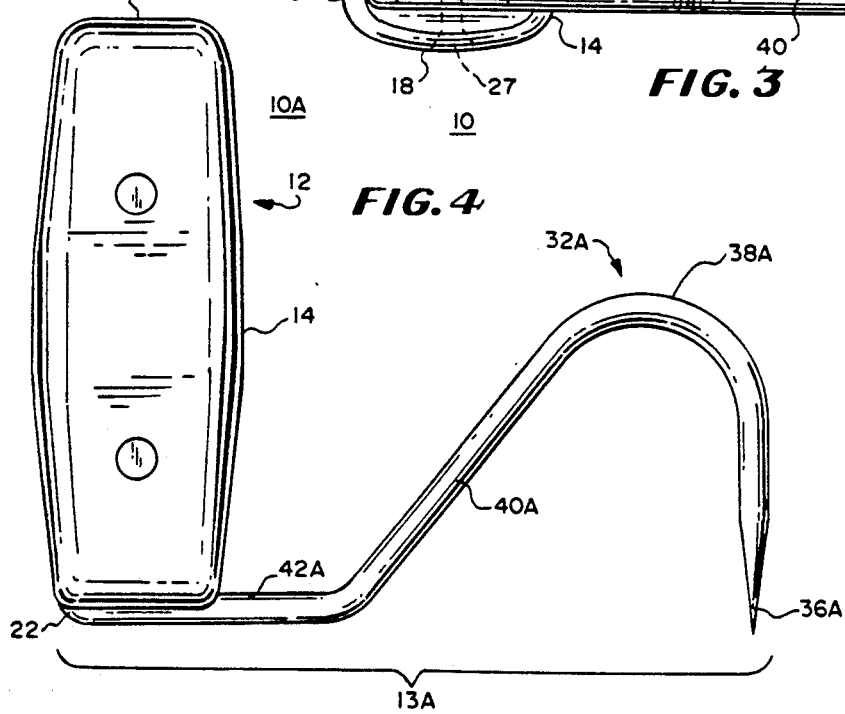

MEAT HOOK

BACKGROUND OF THE INVENTION

This invention relates to meat hooks, and more particularly to a meat hook for use in handling slabs of meat in slaughter houses, meat packing plants and the like.

One type of meat hook now in use includes a handle and a hook portion. The hook portion includes a curved, elongated solid metal cylinder having a straight rod section connected to the handle at one end and a curved section forming a hook with a pointed end extending from the other end of the rod. The rod extends from the midpoint of an elongated handle and the meat hook is held with the rod extending between the first and second fingers or the second and third fingers when the handle is gripped by a user. The curved end section of the hook portion extends out of the plane of the handle. The weight of the meat on the hook portion is at least in part carried by the rod against one or the other of the straddling fingers as the user grips the handle. Many users switch back and forth between the two positions to relieve the pain and trauma to the fingers straddling the elongated metal cylinder.

This type of meat hook has a disadvantage in that the rod extending between the fingers, the disposition of the meat piercing end of the hook and the angle of the wrist from the disposition of the hook portion with respect to the handle may result in injuries such as "tendinitis" from continuous use of the meat hook.

Another type of meat hook known to the art has an elongated handle that receives a U-shaped elongated solid metal cylinder joined to each end of the handle and a curved elongated solid cylinder forming a hook with a pointed end. The hook portion is centrally disposed with respect to the handle and perpendicular to its main axis and extends from the U-shaped elongated cylinder.

This type of hook has a disadvantage in that the U-shaped, elongated, solid metal cylinder and a curved, elongated, solid cylinder forming a hook with a pointed end cannot be formed from a single elongated, solid metal cylinder, which complicates the design and increases the cost and weight of the meat hook.

SUMMARY OF THE INVENTION

Accordingly, it is an object of this invention to provide a novel meat hook.

It is a further object of this invention to provide a novel meat hook in which a single, curved, elongated cylinder forms a hook with a pointed end and extends from only one end of the handle.

It is a further object of this invention to provide a novel meat hook in which an elongated, solid cylinder curved to form a hook with a pointed end extends from only the front face of the handle near one end of the handle and is curved to position the meat piercing end of the hook portion in spaced, near parallel alignment with the front face of the handle.

It is a still further object of this invention to provide a novel meat hook with the meat piercing end of the hook being in the plane of the center of the handle.

It is a still further object of this invention to provide a meat hook that is inexpensive to manufacture.

It is a still further object of this invention to provide a meat hook that is light in weight and corrosion resistant.

In accordance with the above and further objects of the invention, a meat hook is provided having a handle and a hook portion. The handle is sized to be held in one hand by a worker and has the hook portion connected to it and extending from only one side thereof in the same plane as the handle to permit a worker to use the hook while the fingers of the workers hand are next to each other and the wrist is aligned in a natural position with the arm and the hand so as not to require pressure on muscles extending in another direction, such as would be the case if the fingers were spread apart or the wrist tilted to accommodate a meat piercing point that extends out of the plane of the handle during pulling action.

The handle has a main axis which is generally vertical in use and about which the fingers circumscribe. The circumferential length of the handle about the main axis is approximately four and one-eighths inches in the preferred embodiment and should be in the range of between three inches and ten inches in any embodiment for practical holding without discomfort. The length of the handle in the direction of the main axis from the end to which the hook is mounted to the distal end is four inches in the preferred embodiment and should in all embodiments fall within the range of three inches to nine inches. The hook portion extends generally orthogonally from the main axis in the preferred embodiment but may be at an angle in the range of 70 degrees to 110 degrees to the main axis. It includes a pointed end on the end of the hook.

To use the meat hook, the handle is firmly grasped by the user between the user's palm and fingers, with the hook portion extending from the handle above the index finger or below the little finger of the user, enabling the user to selectively position the tapered piercing end of the hook portion above or below the meat to be manipulated by the user. The piercing end of the hook portion is thrust into the meat and the handle is biased by the user to position the meat as desired. In this operation, the hook portion including its meat piercing point is in the same plane as the main axis of the handle and the connecting cylinder is attached to the handle rather than extending perpendicular to the plane of the main axis of the handle and the connecting rod.

As can be understood from the above description, this invention has several advantages, such as for example: (1) it is simple and inexpensive; (2) it reduces the risk of tendenitis; (3) it may be held in either hand as needed; and (4) it may be used with either a downward thrust or with an upward thrust whichever suits the user's needs.

SUMMARY OF THE DRAWINGS

The above noted and other features of the invention will be better understood from the following description when considered in connection with the accompanying drawings, in which:

FIG. 1 is a side elevational view of a meat hook constructed in accordance with one embodiment of the invention;

FIG. 2 is a rear view of the meat hook of the embodiment of FIG. 1;

FIG. 3 is a bottom view of the meat hook of the embodiment of FIG. 1;

FIG. 4 is a side elevational view of the meat hook constructed in accordance with another embodiment of the present invention;

DETAILED DESCRIPTION

Figure 5:
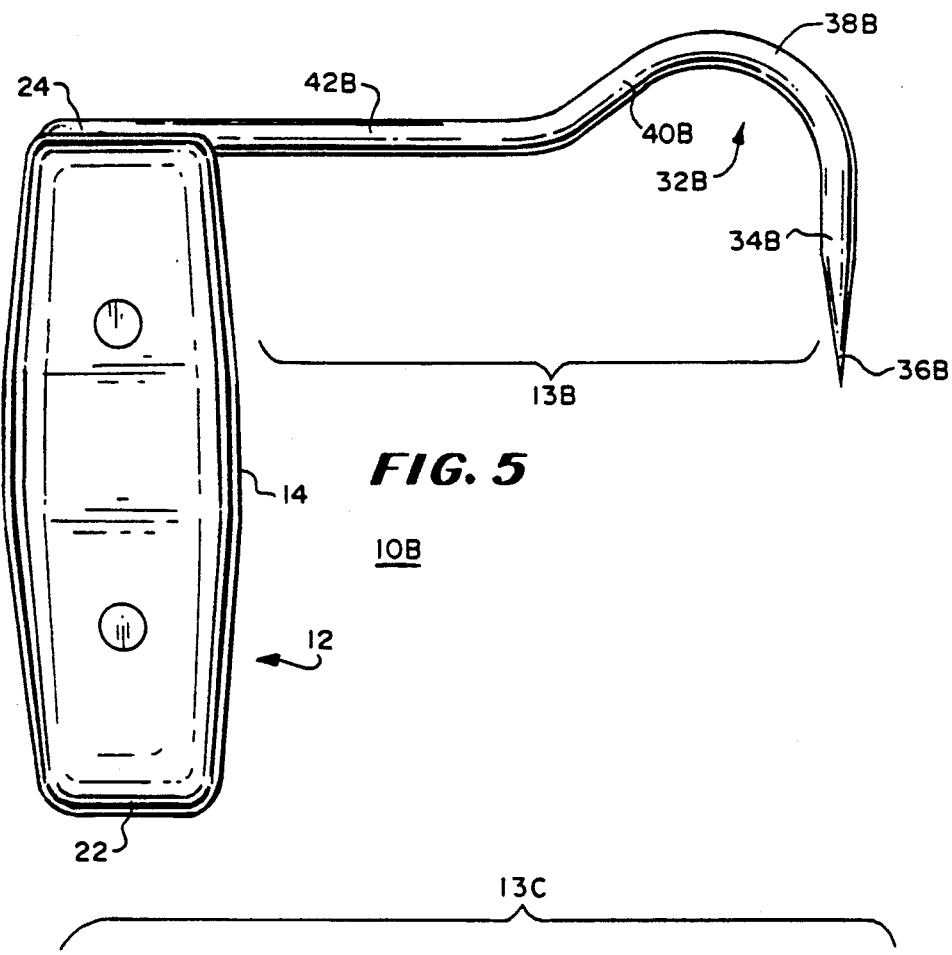
FIG. 5 is a side elevational view of still another embodiment of a meat hook.

In FIG. 1, there is shown a side elevational view of a meat hook 10 having a handle 12 and a hook portion 13. The handle 12 is sized to be held in one hand by a worker and has the hook portion 13 connected to it and extending from only one side thereof in the same plane as the handle to permit a worker to use the hook while the fingers of the worker's hand are next to each other and the wrist is aligned in a natural position with the arm and the hand so as not to require pressure on muscles extending in another direction such as would be the case if the fingers were spread apart or the wrist tilted to accommodate a meat piercing point that extends out of the plane of the handle during pulling action.

The handle 12 has a main axis which is generally vertical in use and about which the fingers circumscribe with the circumferential length of the handle about the main axis being approximately four and one-eighths inches in the preferred embodiment and should be in the range of between three inches and ten inches in any embodiment for practical holding without discomfort. The length of the handle in the direction of the main axis from the end to which the hook is mounted to the distal end is four inches in the preferred embodiment and should in all embodiments fall within the range of three inches to nine inches. The hook portion extends generally orthogonally from the main axis in the preferred embodiment but may be at an angle in the range of 70 degrees to 110 degrees to the main axis.

In the preferred embodiment, the handle 12 has: (1) a narrow front side portion 14 and a narrow rear side portion 16, each being five eights inch in the preferred embodiment; (2) relatively wide opposing sides 18 and 20 (20 is not shown in FIG. 1 but is identical to 18), each being about one and three eights inches in the preferred embodiment; (3) a first end 22; and (4) a second end 24. It is preferably constructed of light weight corrosion resistant material, such as plastic, wood, aluminum or the like and may be coated with a resilient material 26, such as rubber which resists liquid penetration and is easy to clean.

Extending at substantially right angles to the main axis of the handle 12 and from the front side portion 14 of the handle 12 is the hook portion 13 which is an elongated solid metal cylinder formed to have a straight rod section 42 and a curved end section 32 with a piercing end point 36. The straight rod section 42 is: (1) near and connected to the first end 22; (2) rigidly formed to be secured to the handle 12 by any conventional means; and (3) makes an angle with the main axis of the handle 12 of approximately 90 degrees from the front side portion 14 of the handle 10. The piercing end 36 of the curved end section 32 extends beyond a plane which passes through the end of the handle, generally away from the second end of the handle.

The curved end section 32 of the hook portion 13 includes an inclined length 40, a curved length 38 and a straight rod length 34. The curved length 38 extends from the straight rod length 34 to the inclined section 40. The inclined section 40 joins straight rod section 42 extending from the front side portion 14 of handle 12 near the first end 22.

The straight rod section 42 is secured at first end 22 to the handle 12 by any conventional fastening means and may be formed to extend the length of handle 12, if desired. The securement of rod section 42 to handle 12 should provide a rigid connection between handle 12 and the hook portion 13. The hook portion 13 is preferably made of an elongated solid metal cylinder having corrosion resistance, such as stainless steel, plated steel or aluminum. The hook portion 13 in the preferred embodiment extends three and one-half inches and should extend in the range of two to six inches from the handle 12. The straight rod section 42 is between one-half and one and one-half inches. The inclined length 40 is at an angle that in some embodiments causes the piercing end point 36 to extend below the plane of the first end 22 and in other embodiments be in the plane or above it. The straight rod length 34 is between three quarters inch and two inches long.

The handle 12 is formed in two parts held together by the two fasteners 25 and 27 and containing between them a flattened section 29 of the hook portion 13 integrally formed with the straight rod section 42 to hold it to the handle 12. The fasteners 25 and 27 pass through the flattened portion 29. The handle 12 is shown from one of two wide sides in FIG. 1.

As best shown in FIG. 2 and FIG. 3, which are a rear view and a bottom view respectively of the meat hook 10, the handle 12 (FIGS. 2 and 3) comprises a narrow front side portion 14 (FIG. 3), a narrow rear side portion 16 (FIGS. 2 and 3) and wide opposing side portions 18 and 20 (FIGS. 2 and 3), with the hook portion 13 (FIG. 3) extending from the front side portion 14 near first end 22. The front side portion 14, rear side portion 16 and side portions 18 and 20 may be slightly tapered for ease of grasping by the user's hand.

In FIG. 4, there is shown a meat hook 10A having a handle 12 substantially the same as the handle of the embodiment of FIGS. 1-3 and a hook portion 13A substantially the same as the hook portion 13 in the embodiment of FIGS. 1-3. However, the meat hook 10A has a slightly different curved end section 32A of the hook portion 13A. This curved end section 32A includes an inclined length 40A that makes a more obtuse angle with the plane of the front end 22 of the handle 12 than does the inclined length 40 of the embodiment of FIGS. 1-3.

The inclined length 40 in the embodiment of FIGS. 1-3 makes an angle of approximately 25 degrees while the inclined length 40A in the embodiment of FIG. 4 is at an angle of 40 degrees with the plane of the first end 22 so that the piercing end 36A is in the plane of the first end 22 while the piercing end 36 of FIGS. 1-3 extends below the plane of the first end 22. The tapered piercing end 36A is spaced from the handle 12, is generally parallel to front portion 14 of handle 10A, and lies between the extended planes of the first and second ends 22 and 24. The piercing end 36A of the hook portion 13A is within the plane of the central axis of the handle 12 and points away from the second end 24 of the handle 12.

In FIG. 5, there is shown an alternate embodiment 10B of the meat hook having a handle 12 that is substantially the same as in the embodiments of FIGS. 1-4 but wherein the straight section 42B of the hook portion 13B extends approximately 90 degrees from second end 24 of the front side portion 14 of handle 12 rather than from the first end 22. The curved section 32B curves towards the front side portion 14 rather than away from it. Thus, the curved end section 32B is formed to substantially extend through a plane which passes through the end of the handle 12 and between its first and second ends 22 and 24 with the meat penetrating point 36B pointed generally towards the plane of the first end 22 of the handle 12 and is above it.

Figure 6:
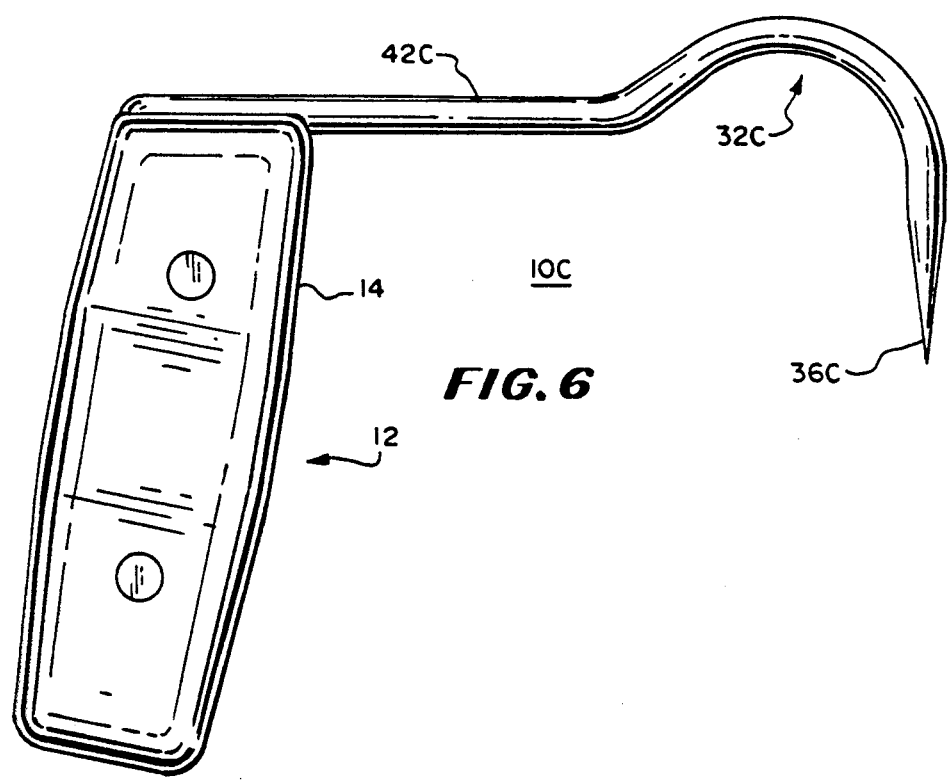
FIG. 6 is a side elevational view of still another embodiment of the meat hook.

In FIG. 6, there is shown an embodiment of a meat hook 10C that is similar to the embodiment 10B shown in FIG. 5 with the exception that the angle between the front side portion 14 of handle 12 and straight section 42C of the hook portion 13C of FIG. 6 is greater than 90 degrees which results in ease of positioning the curved end section 32C. The angle of the embodiment of 10B of FIG. 5 is approximately 90 degrees.

In operation, the handle 12 is grasped by the user's hand (not shown) with the little finger adjacent to straight section 42 or 42A (FIGS. 1 or 4) of the hook portion 13 or 13A, with the curved end section 32 or 32A facing down as shown in FIGS. 1 or 4. The user pierces the meat with piercing end point 36 or 36A of the hook portion 13 or 13A with a downward blow and maneuvers the meat as desired. When the meat is properly positioned, the user raises the meat hook 10 or 10A from the meat and repeats the process as needed.

In FIGS. 5 and 6, an alternate embodiment of the invention is shown, wherein the user grasps the handle 12 with the index finger adjacent to straight section 42B or 42C of elongated cylinder forming a hook with a pointed end 36B or 36C. The meat to be moved is pierced by the pointed end 36B or 36C with a downward blow and the user pushes or pulls the meat hook 10B or 10C to maneuver the meat as desired. When the meat is properly positioned, the user raises the meat hook 10B or 10C from the meat and repeats the process as needed.

If the meat is hanging, it may be desirable to position handle 12 of FIGS. 1 or 4 with the user's index finger adjacent to straight portion 42 or 42A of the hook portion 13 or 13A so that the user may penetrate the meat with an upward thrust and maneuver the meat as desired. In the embodiments of FIGS. 5 and 6, the meat hook 10B or 10C may be held for an upward thrust by grasping handle 12 with the little finger adjacent to straight section 42B or 42C of elongated cylinder forming a hook with a pointed end 36B or 36C.

In each of the uses of the meat hook 10, the wrist is moved in the plane of the wrist. Moreover, the hook portion 13 including its meat piercing point 36 is in the same plane as the main axis of the handle 12 and the connecting cylinder is attached to the handle 12 rather than extending perpendicular to the plane of the main axis of the handle 12 and the connecting rod.

As can be understood from the above description, this invention has several advantages, such as for example: (1) it is simple and inexpensive; (2) it reduces the risk of tendenitis; (3) it may be held in either hand as needed; and (4) it may be used with either a downward thrust or with an upward thrust to suit the user's needs.

Although a specific embodiment of this invention has been described with some particularity, many modifications and variations in the embodiment are possible in the light of the above teachings. Therefore, it is to be understood that within the scope of the appended claims, the invention may be practiced otherwise than as specifically described.

What is claimed is:

1. A meat hook comprising:

an elongated, rigid, curved cylinder having a first pointed, meat piercing end and a second handle engaging end;

a handle rigidly secured to the handle engaging end of the curved cylinder; the handle having a main axis, a first end, a second end, a relatively narrow front side portion and a relatively narrow rear side portion with relatively wide opposing side portions; the handle being sized to extend substantially the width of the user's palm for grasping between the palm and the fingers of the user's hand;

the curved cylinder being formed to extend from the front side portion of the handle in a common plane with the main axis and parallel to planes of the wide opposing side portions of the handle in close proximity to the first end of the handle at an angle approximately 90 degrees from the front side portion of the handle; the curved cylinder being formed to extend from the handle a sufficient distance to clear the user's fingers before curving to form the meat piercing end, said meat piercing end being in the common plane and extending approximately parallel to the plane of the front side portion of the handle, and being in spaced relation therefrom.

2. The apparatus of claim 1 wherein the meat piercing end of the curved cylinder is curved to extend approximately parallel to the plane of the front side portion of the handle and pointing in a general direction away from the second end of the handle.

3. The apparatus of claim 1 wherein the meat piercing end of the curved cylinder is curved to extend approximately parallel to the plane of the front side portion of the handle and being formed to point in a general direction towards the second end of the handle.

4. The apparatus of claim 1 wherein the curved cylinder is inclined at a location beyond the user's fingers to form an incline of less than 90 degrees from the front side portion of the handle prior to curving to extend substantially parallel to the plane of the front side portion of the handle.

5. The apparatus of claim 1 wherein the curved cylinder is made of a strong, corrosion resistant material.

6. The apparatus of claim 1 wherein the front side portion, rear side portion and wide opposing sides of the handle are slightly tapered to more easily conform to the grasp of the user's hand.

7. The apparatus of claim 1 wherein the handle is made of a corrosion resistant material.

8. The apparatus of claim 1 wherein the handle is coated with a nonporous, resilient material for ease of gripping.

9. The apparatus of claim 1 wherein the meat piercing end of the curved cylinder is curved to extend substantially beyond a plane which passes through the first and second ends of the handle.

10. The apparatus of claim 1 wherein the meat piercing end of the curved cylinder is curved and lies between the extended planes of the first and second ends of the handle.

11. The apparatus of claim 1 wherein the meat hook is intended to be grasped by the user with the curved cylinder extending above the index finger of the user.

12. The apparatus of claim 1 wherein the meat hook is intended to be grasped by the user with the curved cylinder extending below the little finger of the user.

13. The apparatus of claim 1 wherein the meat hook may be grasped with the curved cylinder extending above the index finger of the user or alternately grasped with the cylinder extending below the little finger of the user to suit the varying needs of the user.

14. A meat hook comprising:

an elongated, rigid, cylinder having a first tapered, meat piercing end and a second handle engaging end;

a handle rigidly secured to the handle engaging end of the rigid cylinder; the handle having a main axis, opposed first and second ends, a front side portion, a rear side portion and opposed side portions sized to be larger than the front and rear side portions of the handle; the handle sized to be firmly gripped between the palm and fingers of a user during use;

the rigid cylinder formed to extend from the front side portion of the handle in a common plane with the main axis and in proximity to the first end of the handle parallel to planes of the opposed side portions of the handle at an angle approximately equal to or greater than 90 degrees from the front side portion of the handle; the rigid cylinder being formed to extend from the handle a sufficient distance to clear the user's fingers when grasping the handle before curving to form the meat piercing end; the meat piercing end being in the common plane and extending approximately parallel to the plane of the front side portion of the handle in spaced relation therefrom and positioned to extend beyond planes which pass through the first and second ends of the handle.

15. The apparatus of claim 14, wherein the meat piercing end of the rigid cylinder is formed to extend substantially parallel to the plane of the front side portion of the handle and extend in a general direction towards the second end of the handle.

16. The apparatus of claim 14, wherein the meat piercing end of the rigid cylinder is formed to extend substantially parallel to the plane of the front side portion of the handle and extend in a general direction away from the second end of the handle.

17. The apparatus of claim 14, wherein the rigid cylinder is formed at a location beyond the user's grasped fingers at an incline less than 90 degrees from the front side portion of the handle and is curved to form a generally straight piercing end extending substantially parallel to the plane of the front side portion of the handle, the piercing end of the rigid cylinder thus formed lies between the extended planes of the first and second ends of the handle.

18. The apparatus of claim 14 wherein the front side portion, rear side portion and opposed side portions of the handle are slightly tapered to more easily conform to the grasp of the user's grip.

19. A meat hook, comprising:

an elongated cylinder having a first meat piercing end and a second handle engaging end;

a handle rigidly secured to the handle engaging end of the elongated cylinder; the handle having a main axis, a first end, a second end, relatively narrow front and rear side portions, and relatively wide opposing side portions; the handle sized to be firmly grasped between a user's palm and the user's fingers with the handle sized to extend substantially the width of the user's palm;

the elongated cylinder being formed to extend from the front side portion of the handle in a common plane with the main axis and extend parallel to planes of the wide opposing side portions of the handle at an angle substantially equal to or greater than 90 degrees from the front side portion of the handle; the elongated cylinder formed to extend beyond the grasped fingers of the user's hand before curving to form the meat piercing end which has a generally straight portion extending substantially parallel to the plane of the front side portion of the handle in spaced relation therefrom and lies between the extended planes of the first and second ends of the handle and is in the common plane.

20. The apparatus of claim 19, wherein the meat piercing end of the elongated cylinder is formed to extend generally away from the second end of the handle.

21. The apparatus of claim 19, wherein the meat piercing end of the cylinder is formed to generally extend towards the second end of the handle.

22. A method of moving meat with a meat hook having a handle with a main axis and a hook portion in the plane of a main axis comprising the steps of:

grasping the handle of the meat hook in a user's hand with the user's little finger adjacent to a straight section of the hook portion and the user's index finger separated from the hook portion by the other fingers with a curved end length of the hook portion facing downwardly, both the length of the hook portion and a meat piercing end thereof being in a plane of a main axis of the handle;

piercing the meat with a tapered end of the hook portion with a downward blow;

maneuvering the meat as desired;

raising the meat hook from the meat and repeating the process as needed.

23. A method of moving meat with a meat hook having a handle with a main axis and a hook portion in the plane of the main axis comprising the steps of:

grasping the handle of the meat hook in a user's hand with the user's index finger adjacent to a straight section of the hook portion and the user's little finger separated from the hook portion by the other fingers with a curved end length of the hook portion facing downwardly, both the length of the hook portion and a meat piercing end thereof being in a plane of a main axis of the handle;

piercing the meat with the tapered end of the hook portion with an upward thrust;

maneuvering the meat as desired;

raising the meat hook from the meat and repeating the process as needed.

* * * * *